Sept. 11, 1951  O. SANDBERG  2,567,405
WRAPPING MACHINE FOR SANDWICHES AND THE LIKE
Filed March 13, 1946  8 Sheets-Sheet 1
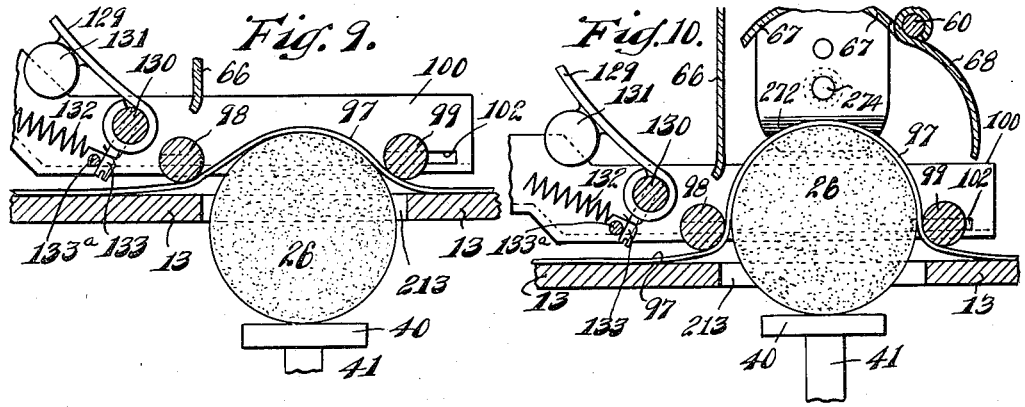
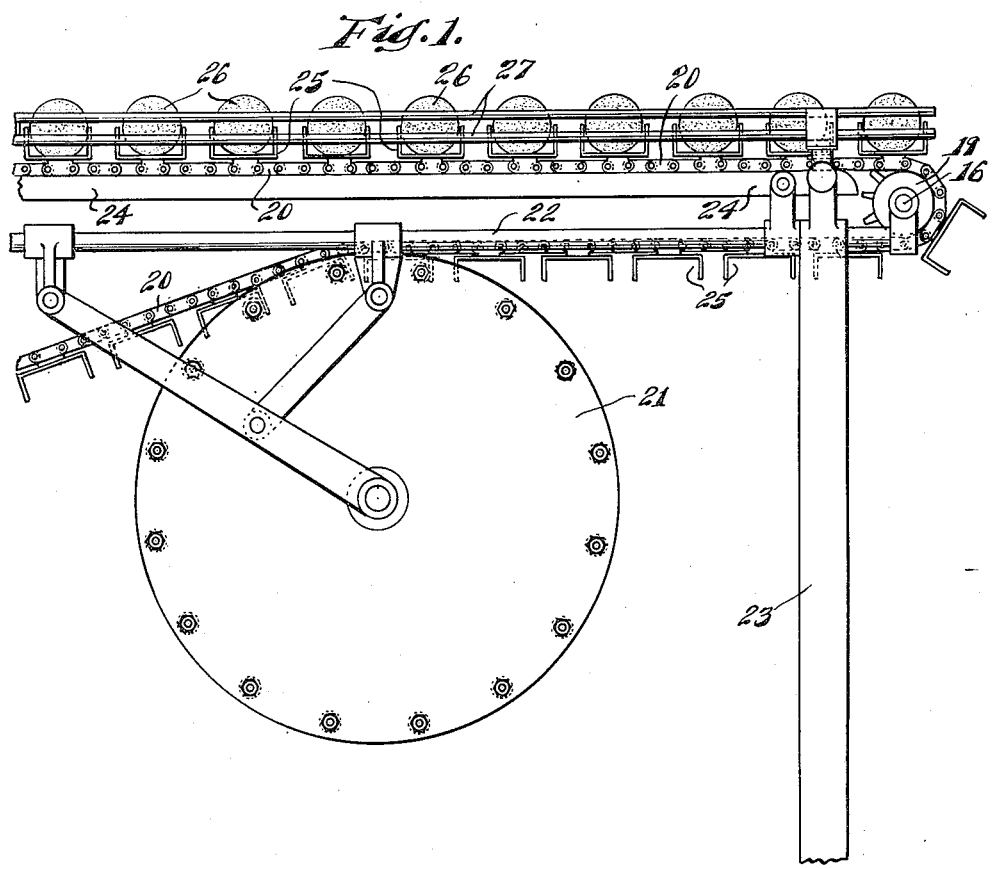
INVENTOR.
Oscar Sandberg.
BY Bair & Freeman
Atty's.

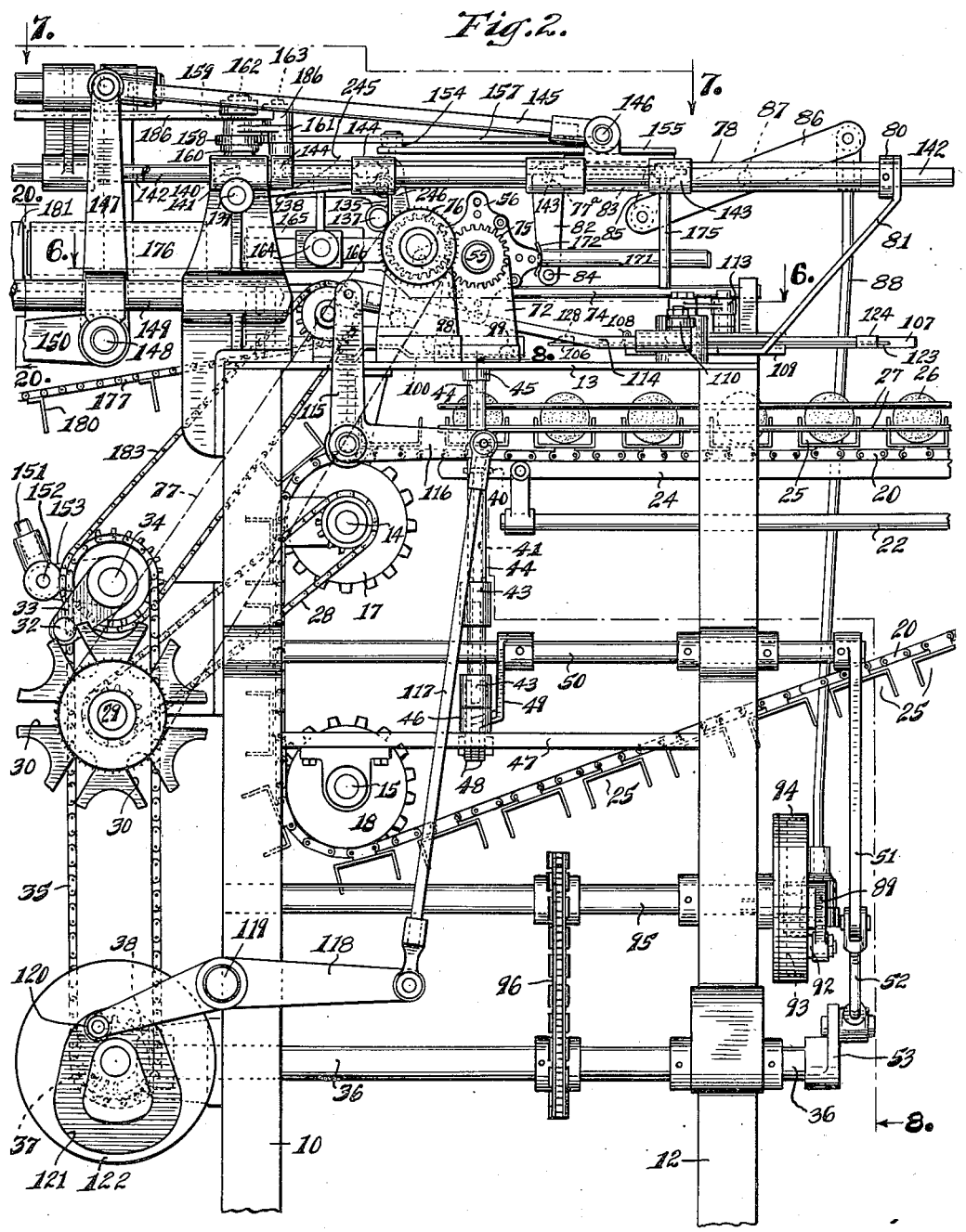

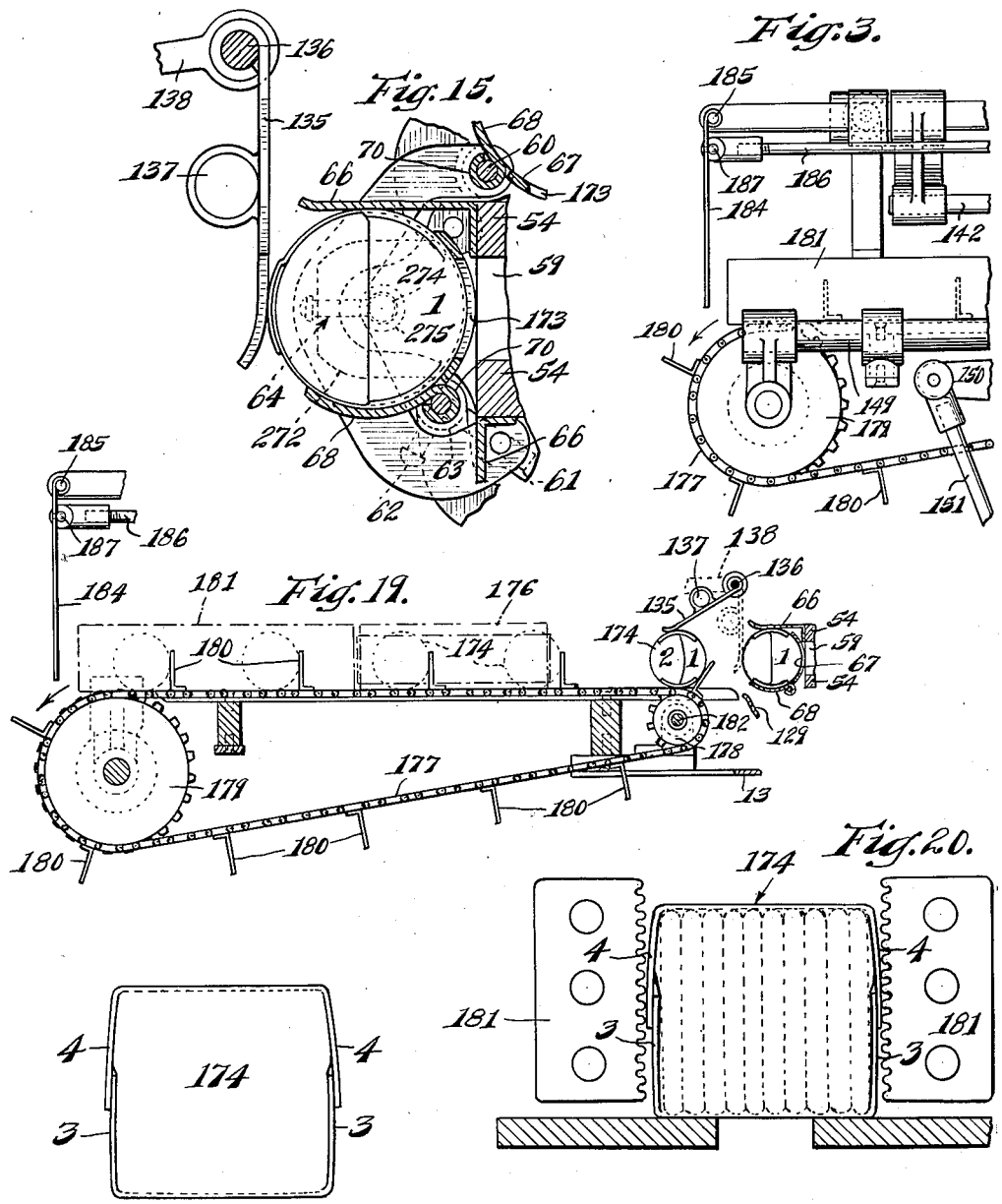

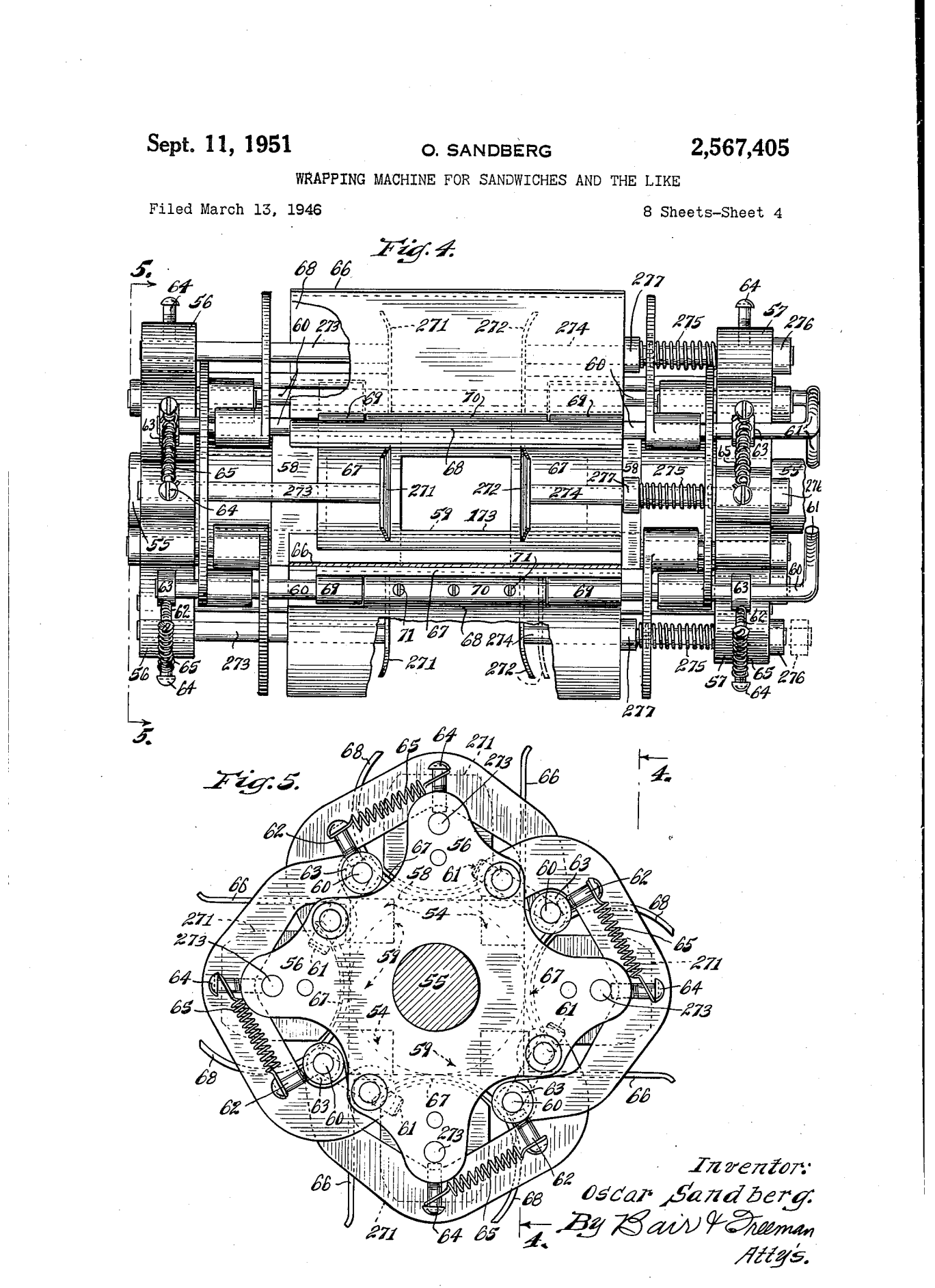

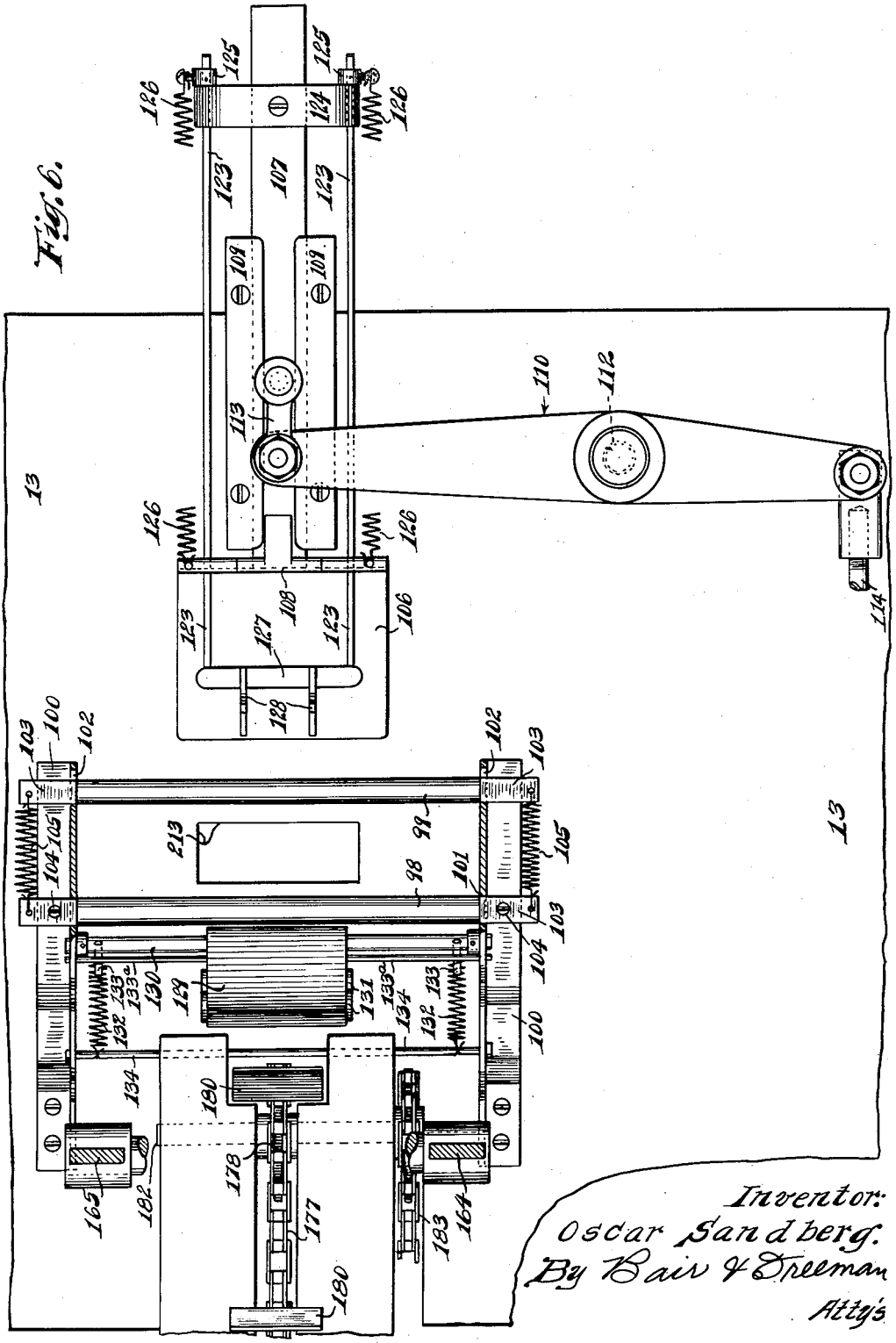

Sept. 11, 1951 O. SANDBERG 2,567,405
WRAPPING MACHINE FOR SANDWICHES AND THE LIKE
Filed March 13, 1946 8 Sheets-Sheet 6
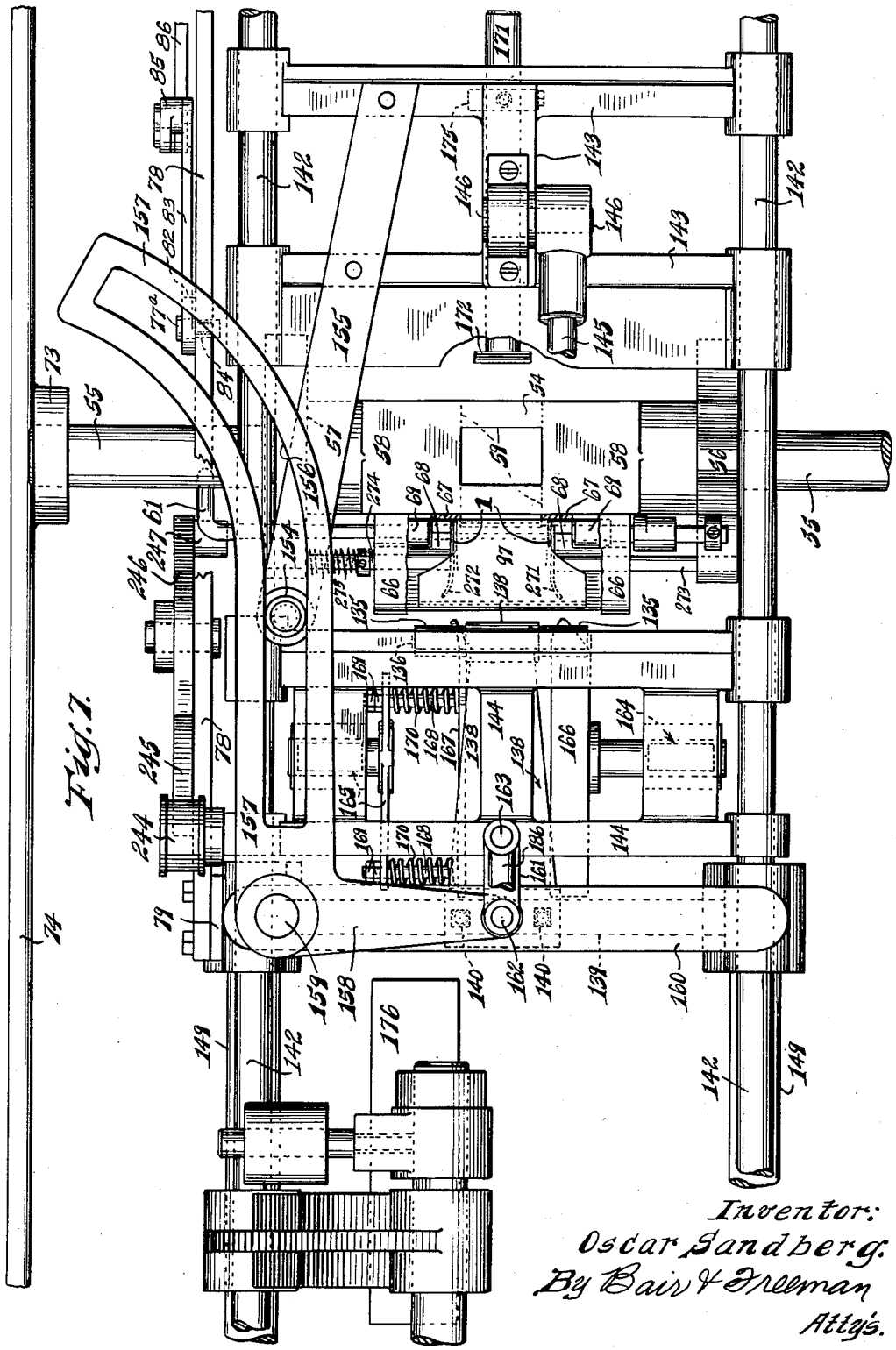
Inventor:
Oscar Sandberg.
By Bair & Freeman
Atty's.

Sept. 11, 1951            O. SANDBERG            2,567,405
WRAPPING MACHINE FOR SANDWICHES AND THE LIKE
Filed March 13, 1946            8 Sheets-Sheet 7
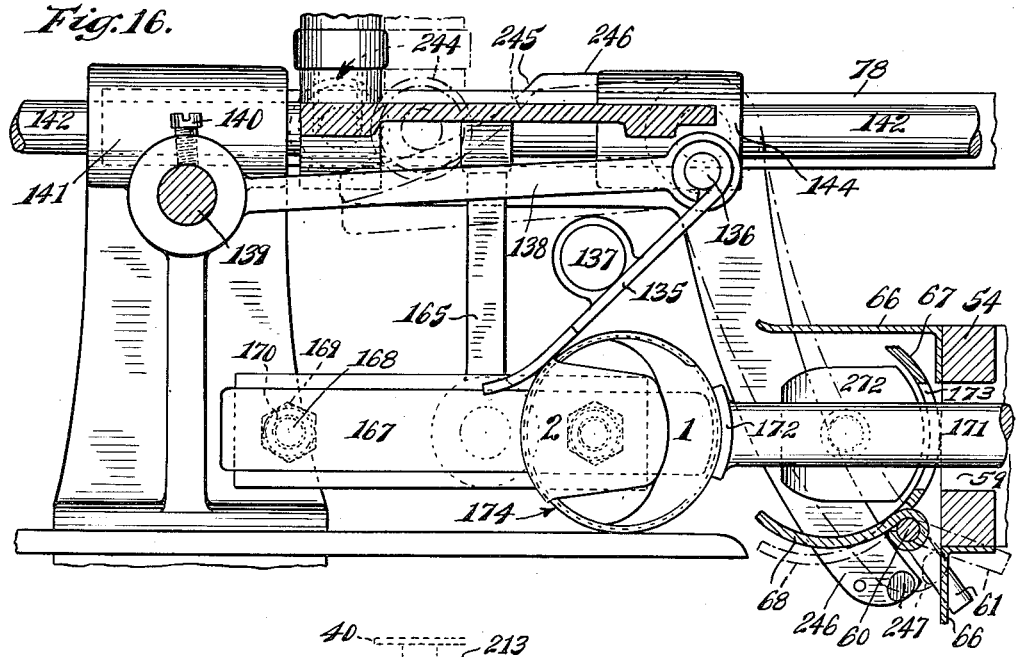
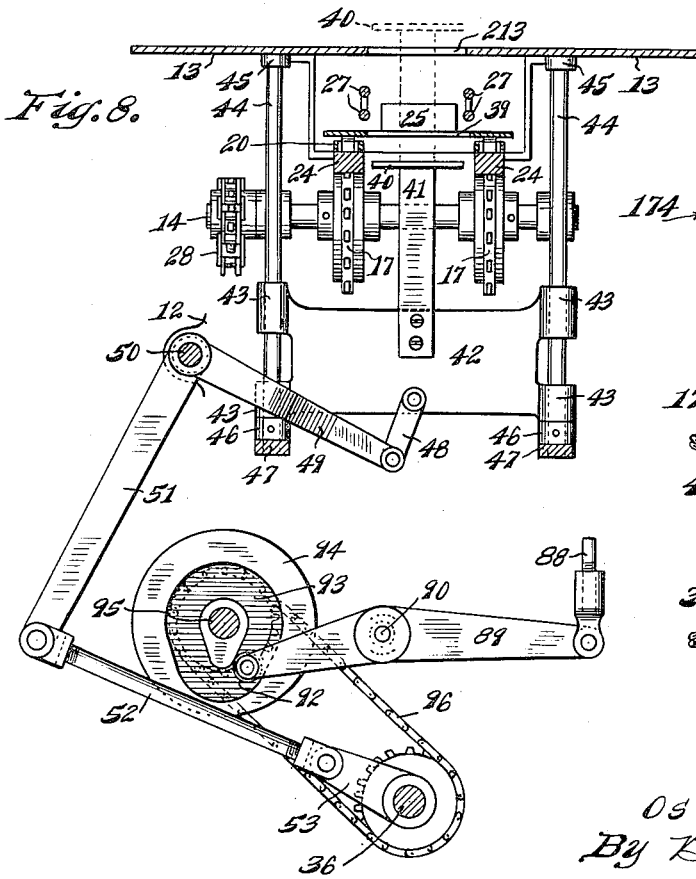
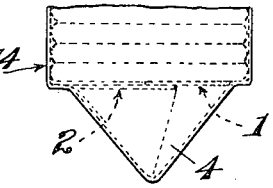
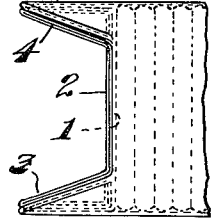
Inventor:
Oscar Sandberg.
By Bair & Freeman
Attys.

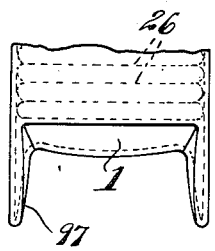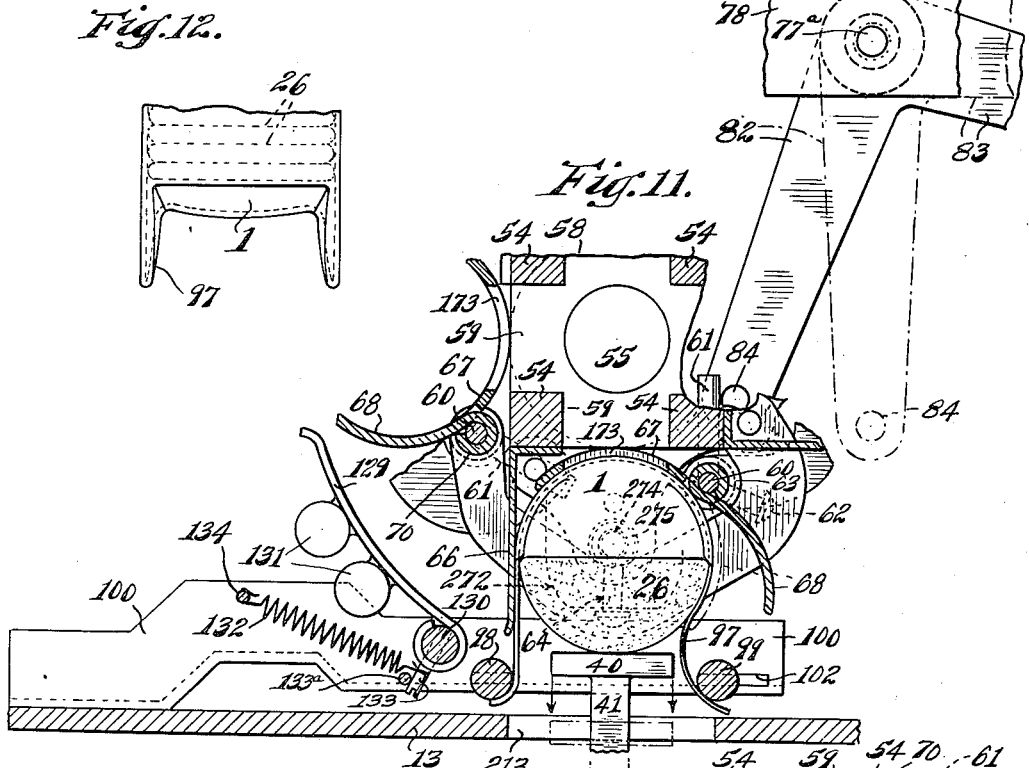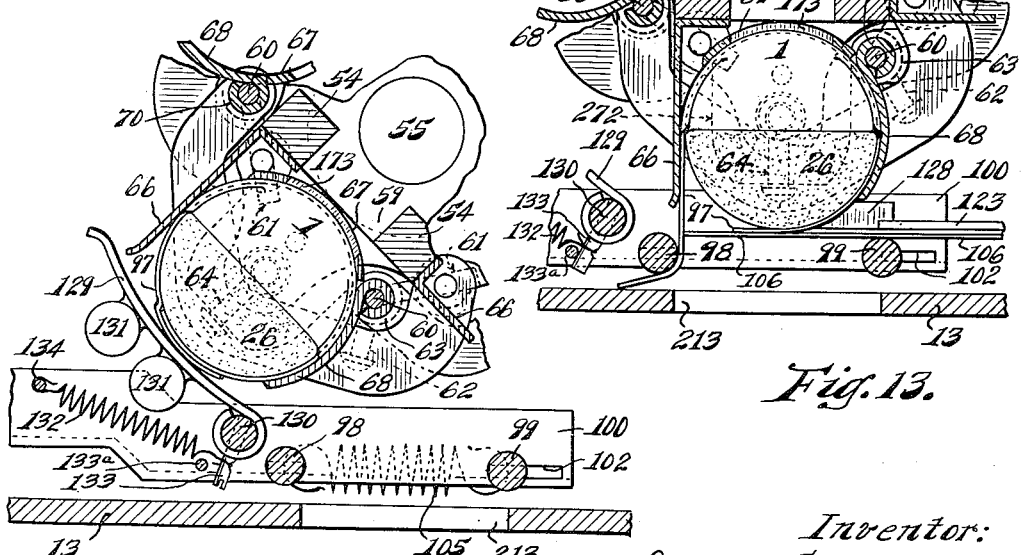

Patented Sept. 11, 1951

2,567,405

UNITED STATES PATENT OFFICE

2,567,405

WRAPPING MACHINE FOR SANDWICHES AND THE LIKE

Oscar Sandberg, Defiance, Ohio, assignor to Lynch Corporation, a corporation of Indiana Application March 13, 1946, Serial No. 654,079

7 Claims. (Cl. 93—7)

An object of my present invention is to provide a machine particularly adapted for wrapping a plurality of cookies, or so-called "sandwiches" which consist of two crackers with cheese or other filling, in a package.

One object of the invention is to provide a wrapping machine which receives stacks of sandwiches in pockets of a pocket conveyor thereof, conveys the stacks successively to a predetermined station and moves them from such station and into a folder head, partially wrapping the stack in the head.

Another object is to provide a folding head in the form of a rotor having a plurality of sandwich receiving pockets to successively receive the stacks of sandwiches and shift them to a second position, another wrapping operation being effected during such shifting, and a heating operation being performed during the shifting for sealing the flap, the wrapping material being of such nature that it is sealed by heat as distinguished from being sealed by glue in the usual manner. A third wrapping operation is then effected at the new position of the folder head pocket by means of a package release mechanism that pushes the package out of the folding head.

Still another object is to provide an end folder operative during the package release operation to perform the third wrapping operation on the package.

A further object is to provide at another station in the wrapping machine a means to finish the end folding operations on the package and finally heat the end folds so that they are sealed together and the sandwiches thereby completely enclosed in the package.

Still a further object is to provide a package release plate at the discharge end of the wrapping machine for releasing the completely wrapped packages, one at a time, and one for each cycle of operation of the wrapping machine.

With these and other objects in view, my invention consists in the construction, arrangement and combination of the various parts of my machine whereby the objects contemplated are attained, as hereinafter more fully set forth, pointed out in my claims and illustrated in the accompanying drawings, wherein:

Fig. 1 is a side elevation of the intake section of a wrapping machine embodying my present invention.

Fig. 2 is a side elevation of the center or wrapping section thereof, this figure being a continuation of the left side of Fig. 1.

Fig. 3 is a side elevation of the discharge section of the machine, this figure being a continuation of the left side of Fig. 2.

Fig. 4 is an enlarged rear elevation showing a folding head.

Fig. 5 is an end elevation of the left end of Fig. 4 as on the line 5—5 of Fig. 4, Fig. 4 being taken as on the line 4—4 of Fig. 5.

Fig. 6 is an enlarged plan view of part of the machine on the indicated dot and dash line 6—6 of Fig. 2.

Fig. 7 is an enlarged plan view of another part of the machine on the indicated dot and dash line 7—7 of Fig. 2.

Fig. 8 is a sectional view on the line 8—8 of Fig. 2 showing a ram and the mechanism for operating it, and The remaining figures show steps in the operation of wrapping a package of sandwiches;

Fig. 9 showing a first step with the sandwiches engaging the wrapper due to elevation of a ram;

Fig. 10 showing a second step with the sandwiches and wrapper entirely in a pocket of a folder head;

Fig. 11 showing a first end flap fold completed;

Fig. 12 being a plan view of the end of the package in Fig. 11;

Fig. 13 showing a first bottom flap fold being made;

Fig. 14 showing a second bottom flap fold being made, and the fold being heated by a first heating plate;

Fig. 15 showing a partially wrapped package at a position to be discharged from a pocket of the folder head;

Fig. 16 showing a second end flap fold completed, and the second bottom flap fold being wiped by a second heating plate;

Fig. 17 being a plan view of one end of the package with the second end flap fold completed;

Fig. 18 being a rear elevation of Fig. 17.

Fig. 19 being a view to show the partially wrapped package being picked up by a discharge conveyor;

Fig. 20 being an enlarged sectional view on the line 20—20 of Fig. 2 to show heat sealing plates for the end flaps of the package; and Fig. 21 showing the completely wrapped package.

On the accompanying drawings I have used the reference numerals 10 and 12 to indicate supporting frame members for the wrapping machine. At the top of the frame members a table 13 connects them together, and the three elements 10, 12 and 13 constitute the main supporting frame of the machine.

Pocket conveyor shafts 14, 15 (Fig. 2) and 16 (Fig. 1) are suitably supported in the main frame and carry sprockets 17, 18 and 19 respectively. A pocket conveyor chain 20 surrounds the sprockets and passes over a large idler wheel 21 shown in Fig. 1. The idler wheel 21 and the shaft 16 are supported by a pair of stationary rods 22 extending rearwardly (toward the right) from the main frame 10—12—13 and by legs 23 at their rear ends.

For supporting the upper stretch of the conveyor chain 20, bars 24 are provided. The conveyor chain has spaced channel shaped article receiving pockets 25 mounted thereon. The pockets 25 are adapted to receive sandwiches or cookies 26 (several face to face in each pocket), and to keep the sandwiches in the pockets a pair of rods 27 is provided along each side of the conveyor.

The pocket conveyor 20—25 is driven by rotating the shaft 14 through a chain drive 28 from an intermittently operated shaft 29. The shaft 29 is driven through a Geneva movement including a notched disc 30 and a crank pin 32 to coact with the notches. The crank pin 32 extends from a crank arm 33 which is secured to a shaft 34.

The shaft 34 is driven by a chain drive 35 from a main shaft 36 adjacent the lower part of Fig. 2 through bevel gears 37 and 38. The main shaft 36 is driven in any suitable manner from an electric motor, for instance through step-down gearing or the like as shown in my Patent No. 2,283,097 issued May 12, 1942.

Each pocket 25 of the pocket conveyor is provided with a central opening 39 (see Fig. 8) adapted to permit a ram head 40 to pass up through the pocket. The ram head is on the upper end of a vertical post 41 secured to a slide 42 provided with four bearings 43. The bearings 43 slide on vertical guide rods 44, which are stationarily mounted with respect to the frame 10—12—13 by having their ends located in bosses 45 and 46. The bosses 45 are connected to the table 13 and the bosses 46 to frame members 47 extending between the vertical frame members 10 and 12.

For vertically sliding the slide 42 and thereby operating the ram 41, I provide a link 48 pivoted to the slide and to an arm 49. The arm 49 is secured to a rock shaft 50 journaled in the frame members 10 and 12. The rock shaft 50 has also secured thereto an arm 51 which is connected by a link 52 to a crank arm 53 on the main shaft 36. The main shaft 36 is rotated once each cycle of operation of the wrapping machine so that the ram head 40 is thereby reciprocated upwardly and returned downwardly once each cycle, and the Geneva movement disc 30 is advanced one-sixth of a revolution each cycle. The advance of the Geneva disc advances the pockets 25 one station each cycle and holds them at their stations, one of which is with the opening 39 of a pocket directly above the ram head 40 so that the ram head can pass up through the pocket.

Above the pocket 25, a folder head is provided. This is best shown in Figs. 4, 5, 11 and 14. It consists of a pair of stub shafts 55 on which a casting is mounted. The casting includes two end plates 56 and 57, with a square connecting post 58 between them. At the center of the post 58, two cross passages 59 are provided at right angles to each other which result in the post 58 having four connecting portions 54.

Each end plate 56 and 57 has journaled therein a rod 60 having a right angled end 61. These rods 60 are constrained to rotate in a clockwise direction in Fig. 5 by means of setscrews 62 in collars 63 on the rods, the outer ends of the setscrews being connected to stationary setscrews 64 by springs 65.

It will be noted that four of the rods 60 are provided, and that the folding head is arranged with four sandwich receiving pockets each formed by a flat plate 66 and arcuate plates 67 and 68. The plates 67 are stationary and have eyes 69 loosely journaling the rods 60 so that the rods can rotate. Each of the plates 68 has one eye 70 secured to its respective rod 60 by three setscrews 71. The springs 65 normally hold the arcuate plates 68 in the positions shown in Fig. 5. The plates 66 are secured to the post sections 54 so that they are stationary with respect to the rotary folder head.

The folder head includes a compression plate 271 and a compression plate 272 for each of the four pockets of the head. The plate 271 is carried by a rod 273 which is stationary with respect to the folder head by being carried in the end plate 56. The plate 272 is carried by a rod 274 which is slidable in the end plate 57, and is constrained to move in an inward direction by a spring 275, the inward limit of movement being determined by a stop collar 276 on the outer end of the rod 274 striking the end plate 57. The inner end of the spring 275 bears against a collar 277 on the rod 274.

The stub shafts 55 are journaled in a bearing 72 on the left side of the machine (see Fig. 2) and a bearing 73 on the right side of the machine (see Fig. 7). The bearing 73 is carried by a rod 74 which is suitably supported in stationary position with respect to the frame of the machine. The rotary folder head is periodically rotated one-quarter of a revolution by means of gears 75 and 76, and a chain drive 77 from the shaft of the gear 76 to the shaft 29, the ratio being six to four as the shaft 29 is rotated a sixth revolution each cycle, and the folder head is to be rotated a fourth revolution each cycle.

With further reference to details of the folder head, means is provided to automatically open the lowermost one of the four pockets as the ram head 40 raises. This means consists of a bell crank 82—83 pivoted at 77a on a stationary frame element 78 (Figs. 2 and 7). The frame element 78 is supported at its forward end on a bracket 79 (Fig. 7), and at its rear end on a cross-bar 80. The cross-bar 80 is in turn supported by a pair of brackets 81 (Fig. 2) extending downwardly at an incline to the frame member 12 and connected thereto. The bell crank consists of a depending arm 82 and a substantially horizontal arm 83, the depending arm carrying a laterally projecting stud 84 and the horizontal arm being connected by a link 85 to a lever 86. The lever 86 is pivoted intermediate its ends at 87 to the frame bar 78, and has pivotally connected with its rear end a vertical link 88.

The link 88 extends downwardly and is pivotally connected to one end of rock arm 89. The rock arm 89 is pivoted at 90 to the frame 12, and carries a roller 92 on its other end. The roller 92 is adapted to travel in a cam groove 93 of a cam 94, which cam is mounted on a shaft 95. The parts just described are illustrated in Fig. 3 in relation to the main shaft 36. The shaft 95 is suitably journaled in the frame elements 10 and 12, and is driven from the main shaft 36 as by a chain drive 96. The shaft 95 likewise rotates once each cycle of operation of the wrapping machine.

The laterally projecting stud 84 of the bell crank 82—83 is adapted to engage the laterally extending arm 61 of the lowermost rod 60 of the folder head when the bell crank is rocked clockwise. This rotates the rod 60 counterclockwise as in Fig. 11, thereby opening the lowermost pocket in the rotary folder head to permit entry of the sandwiches and their wrapper. After they have entered the pocket the bell crank 82—83 is rocked counterclockwise for releasing the extension 61 of the rod 60 so that the spring 65 will return the arcuate plate 68 to closed position as shown by dotted lines for retaining the partially wrapped package therein in cooperation with the plates 66 and 67.

A wrapper for wrapping the package is shown at 97 in Fig. 9. This wrapper is preferably Pliofilm or the like, which is adapted to be sealed by the application of heat thereto, although of course waxed paper, cellophane or the like may be used. The wrapper is preferably supplied to the wrapping machine in roll form, the wrapping machine being provided with means to cut the strip from the roll into individual wrappers as shown for instance in my Patent No. 2,283,096 of May 12, 1942. A paper supply mechanism accordingly is not illustrated in the present case.

The wrapper 97 is fed onto the table 13 in flat form beneath a pair of wrapper control rods 98 and 99. These are supported by a pair of angle shaped supports 100 (see Figs. 6, 9 and 10) having slots 101 and 102 formed therein. The rods have reduced flattened ends 103, projecting through the slots 101 and 102, the ends 103 of the rod 98 being secured to the horizontal flanges of the supports 100 by screws 104. The outer ends of the reduced portions 103 of both rods are perforated, and springs 105 connect the perforations together so that the rod 99 is capable of slight longitudinal floating movement, the normal distance between the rods being slightly less than the diameter of sandwich 26 (shown in Fig. 9) so that the rods will effect a close wrapping of the wrapper 97 around a stack of such sandwiches.

A bottom flap folder is provided for folding the bottom flap of the package as shown in Figs. 6 and 13, and this folder consists of a paper pusher plate 106 carried by a slide bar 107, and hinged thereto on a pivot 108. This arrangement permits upward floating movement of the paper pusher plate 106 and limits its downward movement due to gravity.

The slide bar 107 is slidably mounted in slideways 109, and is reciprocated in the slideways by means of a lever 110. The lever 110 is pivoted intermediate its ends at 112, and has one of its ends connected to the slide bar 107 by means of a link 113. The other end of the arm 110 is connected by a link 114 (Fig. 2) to an upwardly extending arm 115 of a bell crank having a horizontal arm 116. The arm 116 is connected by a link 117 to a rock arm 118 pivoted at 119. The arm 118 carries a roller 120 adapted to travel in a cam groove 121 of a cam 122. The cam 122 is mounted on the shaft 37 whereby the slide bar 107 is reciprocated forwardly and returned rearwardly once each operating cycle of the wrapping machine.

The bottom folder further includes (see Fig. 6) a pair of rods 123 slidably supported by the vertical flange of the paper pusher plate 106, and by a cross bar 124 secured to the slide bar 107. The cross bar 124 has perforated ends to slidably receive the rods 123. On the rear ends of the rods 123, collars 125 are mounted, and these are constrained to engage the cross bar 124 as a stop, by means of a spring 126 for each rod. The front ends of the springs 126 are connected to the plate 106.

The front ends of the rods 123 are connected together by a cross member 127 having a pair of forwardly projecting package engaging elements 128, the purpose of which will hereinafter appear when describing the operation of the machine.

A heating plate 129 (Fig. 11) is pivotally mounted on a rod 130 carried by the supports 100. Heating elements 131 (preferably of electrically energized type) are secured thereto. The heating plate is constrained to move toward the rotary folder head by means of a spring 132 connected with a setscrew 133 of the heater plate and with a cross rod 134 between the supports 100. A stop screw 133a is carried by one of the supports 100 to limit movement of the plate 129.

A second heating plate 135 (see Figs. 15 and 16) is provided which is freely hinged at 136 and normally remains in a substantially vertical position due to the force of gravity. This heating plate 135 has a heating element 137 thereon. The hinge connection 136 is supported by an arm 138 which is pivotly mounted at 139 for adjusting the height of the heating plate 135. Setscrews 140 are provided for retaining the arm 138 in its adjusted position with respect to the shaft 139. The shaft 139 is rigidly supported with relation to the frame of the machine in brackets 141.

Also supported in bearings of the brackets 141 is a pair of fore-and-aft extending rods 142. Slides 143 and 144 are slidably mounted thereon (see Fig. 7). These slides are similar to the slide 42. This slide 143 is reciprocated once each cycle of operation of the wrapping machine by means of a link 145 pivoted thereto at 146, and extending forwardly to where it connects with the upper end of an arm 147 in Fig. 2. The arm 147 is secured at its lower end to a rock shaft 148 suitably journaled with respect to forwardly extending stationary rods 149 constituting part of the frame of the machine. A horizontal arm 150 is also secured to the rock shaft 148 and its outer end is connected by a link 151 to a crank pin 152 of a crank arm 153. The crank arm 153 is secured to the shaft 34.

The slide 144 is operated from the slide 143 by means of a roller 154 carried by an arm 155 extending from the slide 143. The roller 154 travels in a curved slot 156 of an arm 157 of a bell crank, the other arm of which is illustrated at 158 in Fig. 7.

The bell crank is pivoted at 159 on a stationary cross member 160 secured to the rods 142. The bell crank arm 158 is connected by a link 161 to the slide 144, its pivotal connections being shown at 162 and 163.

The slide 144 carries a roller 244 adapted to engage a cam surface 245 of a bell crank shaped cam arm 246 (Fig. 16). A stud 247 is carried by the lower end of the arm 246, and is adapted to engage the extension 61 of the rod 60 corresponding to that pocket of the rotary folder head which at that time is in a forward position and ready for its arcuate plate 68 to be opened for a purpose which will hereinafter appear.

From the construction of the parts just described it will be obvious that a relatively long sliding motion of the slide 143 on the rods 142 will result in slight swinging movement of the bell crank 157—158, thereby resulting in slight sliding movement of the slide 144 on the rods 142. The purpose of this arrangement is to provide a desired movement of the slide 144 for operating a second end flap folder which will now be described.

Depending from the slide 144 is a pair of brackets 164 and 165 (see Figs. 7 and 16). The bracket 164 carries a stationary shoe 166 and the bracket 165 carries a shoe 17 which floats by means of rods 168 slidably extending through the bracket and provided with stop nuts 169. Springs 170 are interposed between the bracket 165 and the floating shoe 167 for normally extending the shoe to the position shown in Fig. 7.

For removing a partially wrapped package of sandwiches from a pocket of the rotary folder head when such pocket is rotated from a lower position as in Fig. 11 to a forward position as in Fig. 16, I provide a package pusher rod 171 having an arcuate pusher plate 172 on its forward end. The plate 172 is adapted to pass through the central opening 59 of the folder head and then through an opening 173 of the arcuate plate 67 as shown in Fig. 16. In so doing, it pushes the package indicated in this figure as 174, between the shoes 166 and 167 so that the shoes provide a second end flap folding operation on the package as shown in Figs. 16, 17 and 18. At the same time the shoes 166 and 167 are being moved toward the right in Fig. 16, while the package is being moved toward the left to effect the second end flap fold prior to the time the package is ejected from the pocket so that the first end flap is held down and is under the second end flap. The shoes 166 and 167 must then be moved away quickly so that the folding head may rotate another quarter of a turn.

The package pusher rod 171 is carried by a bracket 175 (Fig. 2) depending from the slide 143. The package pusher plate 172 is thereby operated once each cycle of the machine. Ahead of the second end flap folder shoes 166 and 167 is a folding way 176. This way is of the usual construction such as shown in my patents above mentioned, and is adapted for successively folding the third and fourth end flaps of the package as shown at 3 and 4 in Fig. 21. The third and fourth end flaps are also indicated in Fig. 18.

The folding way effects this folding operation as a result of moving the package with respect to the folding way, and such movement is accomplished by means of a package carrier conveyor, including a conveyor chain 177 (Fig. 19). The chain 177 traverses a drive sprocket 178, and an idler sprocket 179, and has cross bars 180 to engage the packages 174 as shown in Fig. 19. The cross bars 180 engage the packages as they are moved out of the folder head by the package pusher plate 172 and drags them under the heating plate 135, then all the way through the space between the second end flap folder shoes 166 and 167 and the third and fourth end flap folding way 176, and finally between a pair of heating plates 181 as shown in Fig. 20. These plates provide the final heating for the third and fourth end flaps 3 and 4 of the package 174 to effect a final sealing of the package.

The drive sprocket 178 for the conveyor chain 177 is secured to a shaft 182 and this shaft is driven by a chain drive 183 from the shaft 34. At the discharge end of the conveyor 177—180 a release plate 184 is pivoted at 185, and a swinging motion is imparted to it once each cycle of the machine by means of a link 186. The link 186 has its forward end pivoted at 187 to the plate 184, and its rear end pivoted on the pivot pin 163 to which the link 161 has already been described as being pivoted.

*Practical operation*

In the operation of my disclosed wrapping machine, while the machine is in operation an operator can stand beside the portion of the pocket conveyor 20—25 shown in Fig. 1 and place the proper number of sandwiches 26 in each pocket, or a suitable hopper can be provided with means to accomplish the conveyor feeding operation. The pocket conveyor advances intermittently, each advance being the distance from pocket to pocket. When a pocket is in position above the ram head 40, the pocket conveyor is stationary whereupon the ram head rises for elevating the sandwiches out of the pocket 25 through the opening 213 of the table 13 and against the wrapper 97 causing the wrapper to be bulged up at the center as shown in Fig. 9.

Further elevation of the ram head 40 results in the sandwiches 26 being elevated to the position shown in Fig. 10 just after the plate 68 has been opened to the position shown due to engagement of the stud 84 with the lateral extension 61 of the rod 60 as shown in Fig. 11. This wraps the wrapper 97 a little over half way around the sandwiches and the closing of the arcuate plate 68 holds it in this partially wrapped position.

Next, one of the bottom flaps of the package is folded as in Fig. 13, this being accomplished by forward movement of the package engaging elements 128 during the first part of the forward movement of the slide bar 107, which is best shown in Fig. 6. Thereafter further forward movement of the slide bar causes the paper pusher plate 106 to continue its movement with the package engaging elements 128 held against the package as in Fig. 13 under tension of the expanding springs 126. The plate 106 goes all the way forward to a position adjacent the front paper engaging rod 98.

As the package moves up into the lowermost pocket of the folder head, it is compressed slightly endwise and a first fold made as illustrated in Figs. 11, 12 and 13, this fold being indicated at 1. The first end fold and the slight compression mentioned are effected by the compression plates 271 and 272 under the action of the spring 275 shown in Fig. 4.

The next step in the wrapping operation is a quarter turn clockwise of the folder head, about half of this movement being shown in Fig. 14. Here it will be noted that the second bottom flap fold has been accomplished due to a wiping action of the package along the heating plate 129. At the same time the heat from the plate seals the second bottom flap to the first one so that the package is now sealed with the exception of its ends. The rest of the quarter rotation of the folder head brings it to the position shown in Fig. 15 where the bottom flaps are now in front and are being further heat sealed by the heating plate 135.

The next step in the operation is to release the package from the folder head and this is accomplished as in Fig. 16 by the forward motion of the ram 171 and the release plate 172 carried thereby. During the release of the package, the arcuate plate 68 is opened as it was when the folder head pocket was in its downward position but this time opening action is accomplished by the stud 247 of the cam arm 256 engaging the extension 61 of the rod 60 as shown by dot and dash lines.

After the pusher plate 172 releases the package from the folder head it is picked up by the cross bars 180 of the carrier chain 177 (see Fig. 19) and carried the rest of the way from under the heating plate 135, through the second end folder shoes 166 and 167 (just after assuming the position of Fig. 15) then through the folding way 176 for accomplishing the third and fourth end folds, and finally between the heating plates 181 for the final heat sealing of the ends of the package. The completely wrapped packages are then periodically released from the carrier chain 177 by the release plate 184, and may drop into a box or other suitable receptacle, may pass to an additional conveyor for carrying them away from the machine, or may fall on to a table or the like which an operator can pick them up and pack them in boxes.

Having described my present wrapping machine and its operation it will be obvious that packages of disk-like objects such as a plurality of cookies or sandwiches of the type described may be readily wrapped in an efficient manner and with considerable speed. The wrapper consists of a rectangular sheet of wrapping material which is effectively wrapped around the sandwiches in such manner that the cylindrical seam as well as the ends are sealed against the entry of dust and moisture. The contents of the packages will therefore remain in excellent condition for a long period of time.

Some changes may be made in the construction and arrangement of the parts of my machine without departing from the real spirit and purpose of my invention, and it is my intention to cover by my claims any modified forms of structure or use of mechanical equivalents which may be reasonably included within their scope.

I claim as my invention:

1. In a wrapping machine for frangible articles a feed conveyor for articles to be wrapped, a ram for elevating an article from said feed conveyor, a table above said ram and having an opening through which said article and said ram may rise, said table being adapted to receive a wrapper above said opening therein, a rotary folding head above said opening of said table having a plurality of pockets to receive the articles and a wrapper, and to effect a first end flap fold on the wrapper, each of said pockets having an openable side, means to open said side as the article and wrapper enter said pocket and for closing said side thereafter to retain said article and wrapper in said pocket, a bottom flap folder movable to a position for engaging a bottom flap of the wrapper in said pocket and folding it around the article, means for rotating said folder head part of a revolution, a heating plate over which the second bottom flap of the wrapper is dragged for folding it over the first bottom flap and applying heat to it to seal the second bottom flap to the first bottom flap as said folder head is rotated, means for opening said side of said folder head pocket at the new position of the pocket, a single ejecting element for moving the article and wrapper out of all the pockets of the folder head, a second heating plate hingedly mounted and adapted to drag on said bottom flaps of said wrapper as the article and wrapper are moved out of said folder head, means for effecting a second end flap fold on the package as it is moved out of the folder head, said means being moved toward the folder head as the partly wrapped package is moved from the head, means for effecting third and fourth end flap folds on the package, and means for heating the third and fourth end flap folds, said last means comprising stationary heating plates between which said means for moving the partly wrapped package moves the package.

2. A wrapping machine for frangible articles of generally cylindrical shape comprising a feed conveyor for articles to be wrapped, means for elevating an article from said feed conveyor, a table above said means having an opening for the means and adapted to receive a wrapper above the opening, a rotary folding head above said opening of said table having a plurality of curved pockets to receive an article and a wrapper and to effect first end flap folds on the wrapper, a bottom flap folder having one part movable horizontally to engage said article with the wrapper therebetween and another portion further movable horizontally under spring tension under said folding head to a position for engaging a bottom flap of the wrapper in said pocket and folding it under the article, means for rotating said folder head a partial revolution, a plate over which the second bottom flap of the wrapper is dragged for folding it over the first bottom flap, a single ejector means for moving the article and wrapper out of all the pockets of the folder head, means for effecting second end flap folds on the package as it is moved out of the folder head, and means for effecting third and fourth end flap folds on the package.

3. In a machine for wrapping frangible articles, a ram for elevating an article, a table above said ram having an opening for the ram and adapted to receive a wrapper above the opening, a rotary folding head above said opening of said table having a plurality of pockets to receive an article and a wrapper and to effect a first end flap fold on the wrapper, each of said pockets having an openable side, means to open said side as the article and wrapper enter said pocket and for closing said side thereafter to retain said article and wrapper in said pocket, means for rotating said folder head a partial revolution and for folding and sealing the bottom flaps of said wrapper during such rotation, means for moving said article and wrapper out of said folder head, means for effecting a second end flap fold on the package as it is moved out of the folder head, said means being moved toward the folder head as the partly wrapped package is moved away from the head, and means for effecting third and fourth end flap folds.

4. In a wrapping machine for wrapping frangible articles, a ram for elevating an article, a table above said ram having an opening for the ram and adapted to receive a wrapper above the opening, a rotary folding head above said opening of said table having a plurality of pockets to receive an article and a wrapper and to effect a first end flap fold on the wrapper, each of said pockets having an openable side, means to open said side as the article and wrapper enter said pocket and for closing said side thereafter to retain said article and wrapper in said pocket, means for rotating said folder head a partial revolution and for folding the bottom flaps of said wrapper during such rotation, means for again opening said side, means for moving said article and wrapper out of all the pockets of said folder head comprising a single ejector element, means for effecting a second end flap fold on the package as it is moved out of the folder head, said last means being moved toward the folder head as the partly wrapped package is moved from the head, and means for effecting third and fourth end flap folds on the package.

5. A wrapping machine for wrapping frangible articles comprising a feed conveyor for articles to be wrapped, a ram for elevating an article from said feed conveyor, a table above said ram having an opening for the ram and adapted to receive a wrapper above the opening, a rotary folding head above said opening of said table having a plurality of pockets to receive articles and wrappers and to effect first end flap folds on the wrappers, means for rotating said folder head one-fourth revolution, means for moving said article and wrapper out of said folder head, means for effecting a second end flap fold on the package as it is moved out of the folder head, said last means being moved toward the folder head as the partly wrapped package is moved from the head, and means for effecting third and fourth end flap folds on the package.

6. In a wrapping machine for wrapping frangible articles of generally cylindrical shape, a ram for elevating an article, a table above said ram having an opening for the ram and adapted to receive a wrapper above the opening, a rotary folder head to receive an article and its wrapper, and to effect a first end flap fold of the wrapper, a bottom flap folder having a portion horizontally movable to engage the package with the wrapper therebetween and a second portion thereafter horizontally movable to position under said folder head for engaging a bottom flap of the wrapper therein and folding it under the article, means for rotating said folder head a partial revolution, a plate over which the second bottom flap of the wrapper is dragged for folding it over the first bottom flap as said folder head is rotated, a single ejecting means for moving the article and wrapper out of the folder head, and means for effecting second, third and fourth end flap folds on the package.

7. In a wrapping machine for wrapping frangible articles, an intermittently movable pocket conveyor having pockets to receive stacks of sandwiches or the like to be wrapped, each pocket having a central opening, a ram adapted to pass through said central opening and lift the sandwiches from a pocket when in stopped position at a station adjacent said ram, a table above said ram and said station and having an opening through which said sandwiches and said ram may rise, said table being adapted to receive a wrapper above said opening therein, a pair of wrapper engaging rods above the wrapper, means to effect a wrapping of the wrapper around the sandwiches as the ram raises, a rotary folding head above said opening of said table having a plurality of pockets to receive sandwiches and a wrapper and to effect a first end flap fold on the wrapper, each of said pockets having an openable side, means to open said side as the sandwich and wrapper enter said pocket and for closing said side thereafter to retain said sandwich and wrapper in said pocket, a bottom flap folder movable to a position for engaging a bottom flap of the wrapper in said pocket and folding it around the sandwiches, means for rotating said folder head part of a revolution, means for opening said side of said folder head pocket at the new position of the pocket and for moving the sandwiches and wrapper out of the folder head, means for effecting a second end flap fold on the package as it is moved out of the folder head, said means being moved toward the folder head as the partly wrapped package is moved from the head, means for moving the partly wrapped package away from said second end flap holder, and a folding way through which the package is carried by said last means, said folding way effecting third and fourth end flap folds on the package.

OSCAR SANDBERG.

REFERENCES CITED

The following references are of record in the file of this patent:

UNITED STATES PATENTS

| Number | Name | Date |
|---|---|---|
| 952,256 | Jacobsen | Mar. 15, 1910 |
| 1,234,722 | Bracy | July 31, 1917 |
| 1,426,429 | Weightman et al. | Aug. 22, 1922 |
| 1,599,154 | Weightman et al. | Sept. 7, 1926 |
| 1,606,233 | Joplin | Nov. 9, 1926 |
| 1,811,751 | Grover | June 23, 1931 |
| 1,851,295 | Schmitt | Mar. 29, 1932 |
| 1,955,493 | Grover | Apr. 17, 1934 |
| 1,968,190 | Clark | July 31, 1934 |
| 1,984,850 | Van Buren | Dec. 18, 1934 |
| 2,037,631 | Hultin | Apr. 14, 1936 |
| 2,397,190 | Malhiot | Mar. 26, 1946 |